(12) United States Patent
Fiedor et al.

(10) Patent No.: US 8,418,644 B2
(45) Date of Patent: Apr. 16, 2013

(54) TANK LEVEL INDICATOR

(75) Inventors: Marian Fiedor, Mosty u Jablunkova (CZ); Veronika Skricilova, Ceske Budejovice (CZ); Pavel Trojak, Velesin (CZ)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 12/673,501

(22) PCT Filed: Jun. 11, 2008

(86) PCT No.: PCT/EP2008/057282
§ 371 (c)(1),
(2), (4) Date: Feb. 14, 2010

(87) PCT Pub. No.: WO2009/021764
PCT Pub. Date: Feb. 19, 2009

(65) Prior Publication Data
US 2011/0192341 A1    Aug. 11, 2011

(30) Foreign Application Priority Data
Aug. 14, 2007 (DE) .......................... 10 2007 038 428

(51) Int. Cl.
*G01F 23/00* (2006.01)

(52) U.S. Cl.
USPC ........................................... 116/227; 33/346

(58) Field of Classification Search .................. 116/227; 33/346, 365, 366.15, 366.17, 366.18, 721–722; 73/313, 290 R; 338/33
See application file for complete search history.

(56) References Cited

U.S. PATENT DOCUMENTS

| | | | | |
|---|---|---|---|---|
| 1,522,355 A * | 1/1925 | Winterhoff | ...................... | 338/33 |
| 2,329,412 A * | 9/1943 | Nelson | ......................... | 73/290 R |
| 2,624,821 A * | 1/1953 | McCandless | .................... | 338/33 |
| RE25,208 E * | 7/1962 | Perkins | ........................... | 73/313 |
| 3,953,845 A * | 4/1976 | Kress | .......................... | 340/450.3 |
| 4,184,370 A * | 1/1980 | Schlick et al. | .................. | 73/313 |
| 4,441,364 A * | 4/1984 | Montie | ............................ | 73/313 |
| 5,765,435 A * | 6/1998 | Grotschel et al. | ............... | 73/313 |
| D430,050 S * | 8/2000 | Housey et al. | ............... | D10/101 |
| 6,724,201 B2 * | 4/2004 | Sato et al. | ...................... | 324/714 |

FOREIGN PATENT DOCUMENTS

| WO | 9641136 A1 | 12/1996 |
|---|---|---|
| WO | 2006132494 A1 | 12/2006 |

* cited by examiner

*Primary Examiner* — Peter Macchiarolo
*Assistant Examiner* — Tania Courson
(74) *Attorney, Agent, or Firm* — Michael Best & Friedrich LLP

(57) ABSTRACT

Tank level indicators are known, having a sensor housing in which a resistance card having a resistance strip, and a wiper acting with the resistance path and rotatable about an axis of rotation. The variable rotating resistance is encapsulated relative to the fuel in the sensor housing, so that no fuel can enter the sensor housing. It is disadvantageous that the wiper slides dryly against the resistance path, because this gives rise to increased friction and increased wear on the resistance path. The wear particles collect in the sensor housing, and can negatively influence the contact between the wiper and the resistance path. According to the invention, the protection of the tank level indicator relative to particles or ice crystals is improved. It is also ensured that particles or ice crystals that enter the tank level indicator can flow out of the housing of the tank level indicator. According to the invention, the sensor housing having at least one fluid inlet in an upper portion and at least one fluid outlet in a lower portion.

20 Claims, 2 Drawing Sheets

TANK LEVEL INDICATOR

CROSS-REFERENCE TO RELATED APPLICATION

This application is a 35 USC 371 application of PCT/EP2008/057282 filed on Jun. 11, 2008.

BACKGROUND OF THE INVENTION

1. Field of the Invention

The invention is based on a tank level indicator.

2. Description of the Prior Art

From International Patent Application WO 2006/132494 A1, a tank level indicator is already known, having a sensor housing in which a resistance card, having a resistor path, and a wiper, cooperating in sliding fashion with the resistor path and rotatably supported about an axis of rotation, are provided. The variable rotary resistor is encapsulated in the sensor housing from the fuel, so that no fuel can get into the sensor housing. It is disadvantageous that the wiper slides dry on the resistor path, since this causes increased friction and increased wear of the resistor path. The particles of worn-off material accumulate in the sensor housing and can adversely impair the contact between the wiper and the resistor path.

It is also known that the resistance card and the wiper are disposed on a mounting plate and are fully exposed to the fuel.

ADVANTAGES AND SUMMARY OF THE INVENTION

The tank level indicator of the invention has the advantage over the prior art that fuel can flow through the sensor housing, and as a result, particles from wear, dirt or ice are washed away from the resistor path of the resistance card and are flushed out of the tank level indicator. This is attained according to the invention in that the sensor housing is embodied as only partly closed and has at least one fluid inlet in an upper portion and at least one fluid outlet in a lower portion. In this way, the protection of the tank level indicator from particles or ice crystals is improved.

It is especially advantageous if elements for trapping particles or ice crystals are disposed in the region of the at least one fluid outlet, because in this way, fewer particles or ice crystals get into the tank level indicator and affect the measurement of the level in the tank.

In an advantageous feature, the elements are embodied as peglike, boltlike, or cylindrical. In this way, a labyrinth is formed, in which particles or ice crystals are caught when they seek to enter the tank level indicator from outside. Particles or ice crystals that are located inside the tank level indicator find an easy way to the outside.

It is also advantageous if the elements are embodied as flat on one side and have chamfers on the diametrically opposite side. In this way, particles or ice crystals entering from below strike the flat surfaces of the means, so that they do not reach the resistor path, and they are carried downward by particles arriving from above and so are removed from the region of the resistor path.

It is highly advantageous if the sensor housing has a mounting part and a cap secured to the mounting part; the mounting part receives the resistance card and the wiper, and the cap covers the resistance card and the wiper. The cap therefore protects the resistor path in this way from frontal and lateral "bombardment" with particles or ice crystals.

It is also advantageous if the cap is clipped onto the mounting part, since in this way the cap is especially easy to install, and thus the production costs are reduced.

BRIEF DESCRIPTION OF THE DRAWINGS

One exemplary embodiment of the invention is shown in simplified form in the drawing and described in further detail in the ensuing description in conjunction with the drawings, in which.

DESCRIPTION OF THE PREFERRED EMBODIMENT

Figure 1:
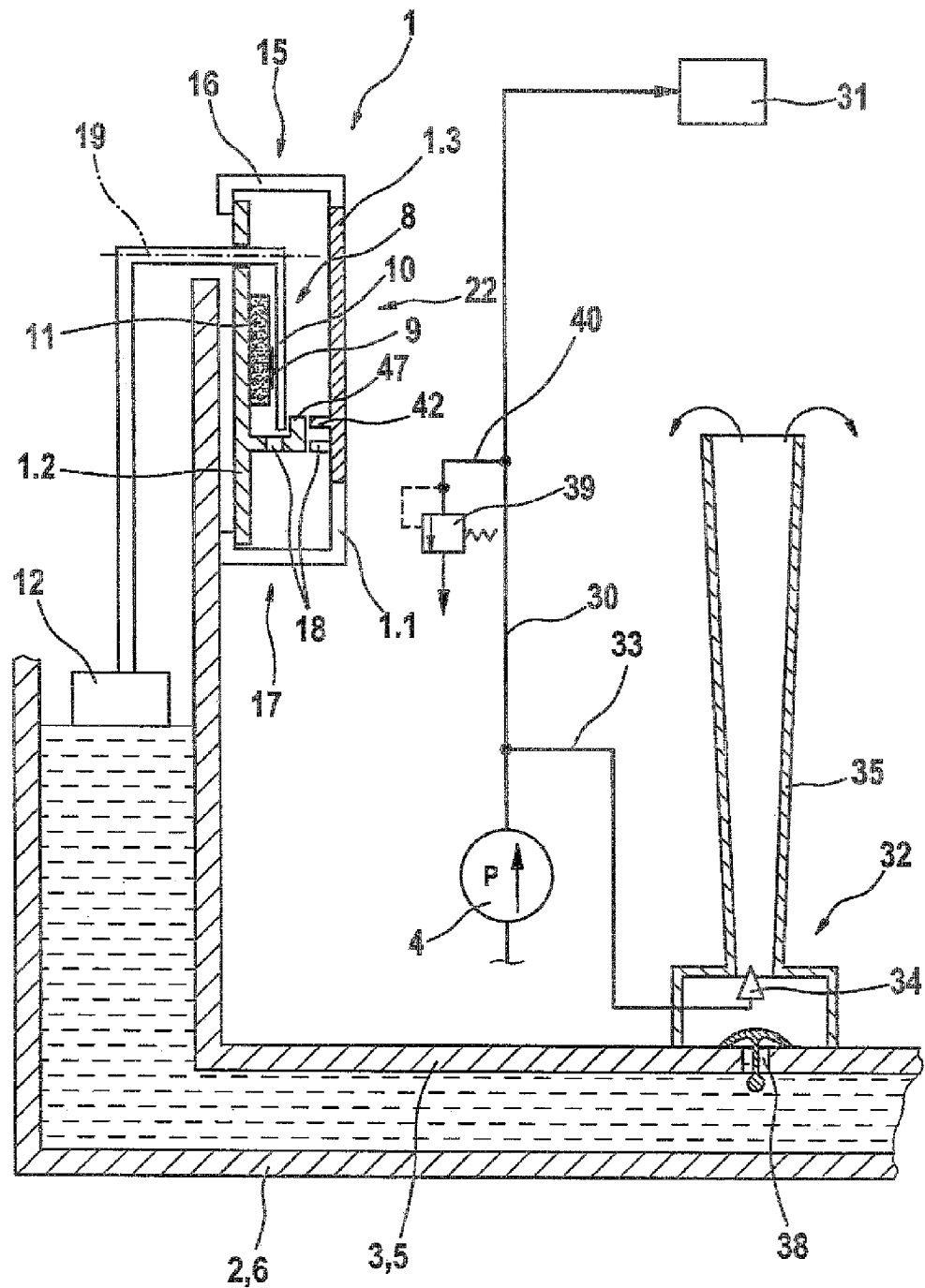
FIG. 1 shows a tank level indicator of the invention in section.

FIG. 1 shows a tank level indicator of the invention in section.

The tank level indicator 1 is disposed in a fuel tank 2 and serves to ascertain a level in the fuel tank 2. The tank level indicator 1 is secured to a wall in the fuel tank 2, for instance to a storage pan 3 provided in the fuel tank. The storage pan 3 serves to store a predetermined amount of fuel for a delivery unit 4, disposed in the storage pan 3, so that this unit can aspirate fuel even at low levels in the fuel tank 2 and during acceleration, braking, cornering, and/or driving uphill and downhill. The storage pan 3 is for instance embodied in panlike fashion and has a bottom 5. The storage pan 3 is disposed on a bottom 6 of the fuel tank 2.

The tank level indicator 1 has a rotary resistor 8, whose electrical resistance is variable. The variable rotary resistor 8 has at least one wiper path, for instance a resistor path 9 and a rotatably supported wiper 10 cooperating with the resistor path 9. Depending on the position of the wiper 10 on the resistor path 9, a predetermined electrical resistance is established. Such rotary resistors are known for instance from German Patent Disclosure DE 10 2006 039 401 A1. The resistor path 9 is embodied on a ceramic substrate that is known as a resistance card 11. The wiper 10 is mechanically coupled to a float 12 that floats on the surface of the liquid in the fuel tank 2 and transmits changes in the level to the wiper 10 via a rotary motion. Whatever electrical resistance is established is a measure for the level in the fuel tank 2.

The tank level indicator 1 has a sensor housing 1.1, in or on which the resistance card 11 and the wiper 10 are disposed.

According to the invention, it is provided that the sensor housing 1.1 has at least one fluid inlet 16 in an upper portion 15 and at least one fluid outlet 18 in a lower portion 17. In this way, fuel can flow through the sensor housing 1.1, so that wear particles, dirt particles or ice crystals are washed away from the resistor path 9 by the fuel. The lower portion 17 of the sensor housing 1.1 is oriented toward the bottom 5 of the storage pan 3, and the upper portion 15 of the sensor housing 1.1 is oriented toward the pan bottom 5.

Figure 2:
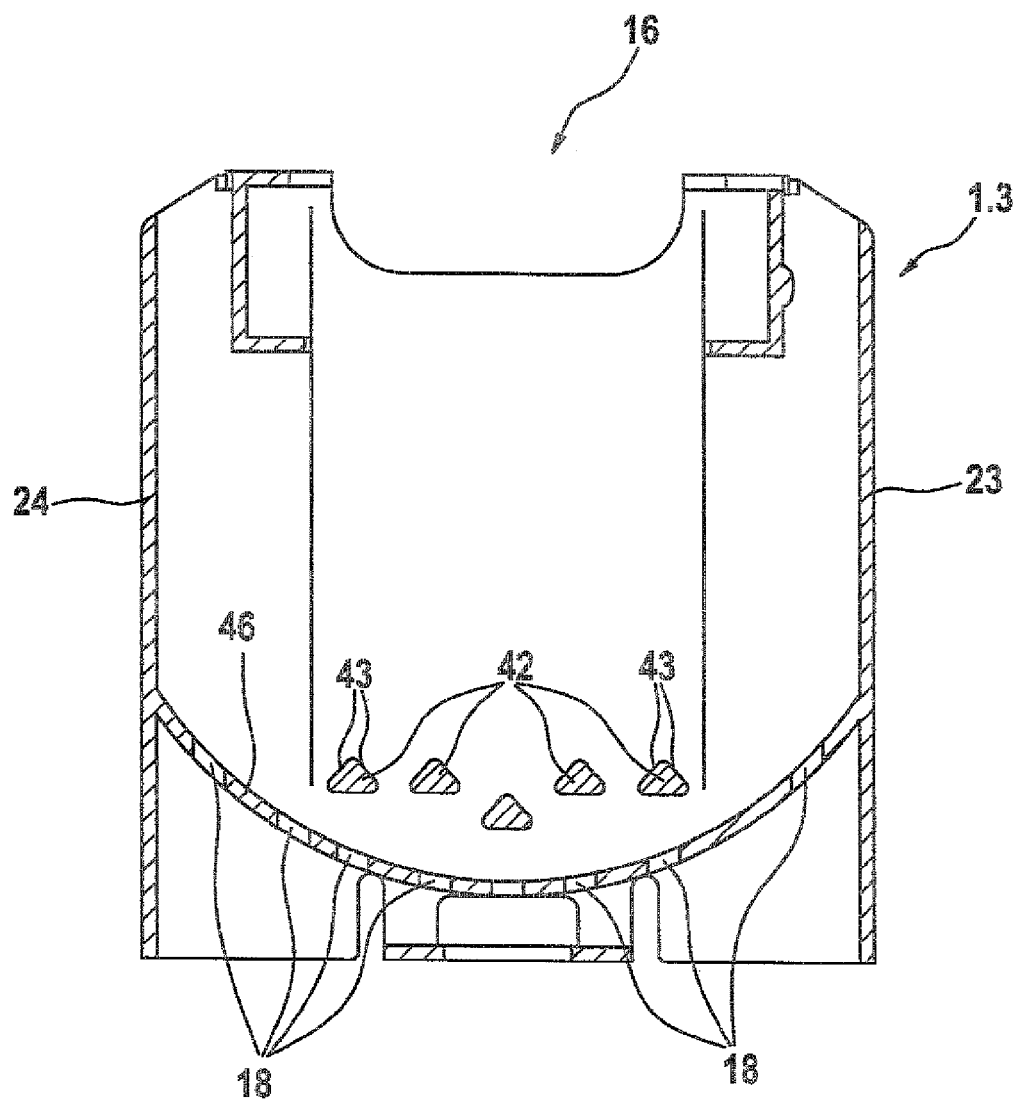
FIG. 2 is a front view of a cap of the invention of the tank level indicator of FIG. 1.

The sensor housing 1.1 is formed for instance by a mounting part 1.2 and a cap 1.3 disposed on the mounting part 1.2. The resistance card 11 is secured for instance to the mounting part 1.2, and the wiper 10 is rotatably supported about an axis of rotation 19. The cap 1.3 covers the resistance card 11 and the wiper 10 in such a way that they are protected against fuel from a front end 22 and for instance from the right and left sides 23, 24 (FIG. 2). In this way, the cap 1.3 forms a protective shield. The fluid inlet 16 is provided for instance on the cap 1.3, but may also be embodied on the mounting part 1.2. The at least one fluid outlet 18 is embodied on the mounting part 1.2 and/or on the cap 1.3. In the exemplary embodiment, seven fluid outlets 18 are embodied on the cap 1.3. The cap 1.3 is clipped to the mounting part 1.2, for instance, but can also be secured to the mounting part 1.2 in some other way.

The delivery unit 4 disposed in the storage pan 3 aspirates fuel from the storage pan 3 and delivers it at elevated pressure via a pressure line 30 to an internal combustion engine 31. For filling the storage pan 3 with fuel, a suction jet pump 32 is provided, which is driven via a drive line 33 that branches off from the pressure line 30. The suction jet pump 32 has a nozzle 34, whose driving jet is aimed into a mixing conduit 35. In a known manner, the driving jet tears surrounding fuel along with it, so that fuel is aspirated from the fuel tank 2 into the storage pan 3 via an intake opening 38 in the storage pan 3. The mixing conduit 35 discharges into the storage pan 3 downstream of the nozzle 34. The mixing conduit 35 is for instance disposed upright, but it can expressly also be disposed horizontally.

For establishing a predetermined pressure in the pressure line 30, a pressure regulating valve 39 is provided, which beyond a predetermined pressure in the pressure line 30 causes fuel from the pressure line 30 to flow back via a return 40 into the storage pan 3 or into the fuel tank 2.

In the fuel, ice particles can form at low temperatures near or below the freezing point of water. These particles occur in the fuel tank 2 when the vehicle is not in operation and is exposed to low temperatures. The ice particles accumulate near the bottom 6 of the fuel tank 2 or close to the bottom 5 of the storage pan 3. When the engine 31 is started, fuel containing ice particles is aspirated by the suction jet pump 32 and distributed and made turbulent in the storage pan 3. Since the resistor path 9 and the wiper 10 of the tank level indicator 1 are exposed to the fuel and can be bathed by it, it can happen that ice particles get into the gap between the wiper 10 and the resistance card 11 and lift the wiper 10 from the resistor path 9 in such a way that a measurement signal is no longer received, and a level is no longer indicated. In these cases, the gauge is not functional again until, a predetermined length of time after engine starting, the ice particles have melted from the heating of the fuel in the fuel tank 2 or until they are washed from the resistance card 11 in the course of the motion of the wiper 10.

Particularly when the tank level indicator is disposed in the vicinity of the suction jet pump 32 and/or of the return 40 of the pressure regulating valve 39, many ice particles can get into the tank level indicator.

These intermittent failures of the fuel gauge are avoided according to the invention because the resistance card 11 and the wiper 10 are covered by the cap 1.3. In this way, the great majority of the ice particles are kept away from the tank level indicator.

So that no ice particles will get into the sensor housing 1.1 from below through the fluid outlet, at least one means 42 for trapping particles is disposed in the region of at least one fluid outlet 18, and because of their inertia the particles strike this means and are separated out in this way. The means 42 are disposed inside the sensor housing 1.1 in such a way that they adjust the rectilinear way to the resistance card 11, so that a flow deflection is forced as a result of which the particles are separated out. As viewed from outside into the sensor housing 1.1, the means 42 are disposed behind the fluid outlet 18 and spaced apart from it.

On the side toward the fluid outlet 18, the means 42 are embodied as flat, so that particles entering there strike that side and go no further, so they do not reach the inside of the sensor housing 1.1. The means 42 are disposed such that the fluid outlets 18 in projection are covered at least in some portions by a means 42. The means 42 for instance have a triangular, quadrangular, polygonal, circular or oval cross section and are embodied in peglike, boltlike, cylindrical or similar fashion.

On their side toward the fluid inlet 16, the means 42 have chamfers 43, in such a way that particles entering from above through the fluid inlet 16 are directed by the chamfers 43 to the fluid outlets 18.

If the level in the fuel tank 2 is higher than the storage pan 3 and there are sloshing motions in the fuel tank 2, particles or ice crystals can get into the sensor housing 1.1 through the fluid inlet 16. It has been found that the particles or ice crystals in this case predominantly sink or drop downward in a straight line and can exit via the fluid outlets 18—virtually unhindered by the means 42. If particles or ice crystals happen to be located on the at least one wiper path, they are pushed away by the wiper 10 and flushed downward along with the fuel. As a result, there are no longer any misfires of the tank level display.

The ice particles can get into the tank level indicator with the fuel or by way of the gas phase.

Some of the for instance seven fluid outlets 18 are provided on a strutlike wall 46 of the cap 1.3. The strutlike wall 46 is for instance embodied in the form of part of a circle (FIG. 2) and extends as far as the mounting part 1.2, in the exemplary embodiment up to a guide 47 of the mounting part 1.2. A fluid outlet 18 is likewise provided in the guide 47. The guide 47 limits the axial play of the wiper 10.

FIG. 2 shows a front view of the cap of the invention of the tank level indicator of FIG. 1.

In the cap of FIG. 2, the parts that remain the same or function the same as in the tank level indicator of FIG. 1 are identified by the same reference numerals.

The means 42 for trapping particles are disposed side by side; for instance, four means 42 form one row, and a fifth means 42 is disposed upstream of that row.

The foregoing relates to the preferred exemplary embodiment of the invention, it being understood that other variants and embodiments thereof are possible within the spirit and scope of the invention, the latter being defined by the appended claims.

The invention claimed is:

1. A tank level indicator comprising:
a sensor housing;
a resistance card provided in the sensor housing;
a wiper provided in the sensor housing, the wiper being rotatably supported about an axis of rotation and cooperating in sliding fashion with the resistance card to establish an electrical resistance based on relative positions of the wiper and the resistance card;
at least one fluid inlet in an upper portion of the sensor housing; and
at least one fluid outlet in a lower portion of the sensor housing.

2. The tank level indicator as defined by claim 1, wherein the wiper is coupled to a float that floats on a surface of liquid having a level to be determined by the tank level indicator.

3. A tank level indicator comprising:
a sensor housing;
a resistance card provided in the sensor housing;
a wiper provided in the sensor housing, the wiper being rotatably supported about an axis of rotation and cooperating in sliding fashion with the resistance card;
at least one fluid inlet in an upper portion of the sensor housing;
at least one fluid outlet in a lower portion of the sensor housing; and
means for trapping particles disposed in a region of the at least one fluid outlet.

4. The tank level indicator as defined by claim 3, wherein the means for trapping particles are embodied as peglike, boltlike, or cylindrical.

5. The tank level indicator as defined by claim 1, wherein the sensor housing has a mounting part and a cap secured to the mounting part, and the mounting part receives the resistance card and the wiper, and the cap covers the resistance card and the wiper.

6. The tank level indicator as defined by claim 5, wherein the at least one fluid outlet is embodied on the mounting part or on the cap.

7. The tank level indicator as defined by claim 5, wherein the at least one fluid outlet is embodied on a strutlike wall of the cap, which wall extends as far as a sealing edge of the mounting part.

8. The tank level indicator as defined by claim 3, wherein the means are embodied as flat on one side and have chamfers on the diametrically opposite side.

9. The tank level indicator as defined by claim 3, wherein the sensor housing has a mounting part and a cap secured to the mounting part, and the mounting part receives the resistance card and the wiper, and the cap covers the resistance card and the wiper.

10. The tank level indicator as defined by claim 9, wherein the means for trapping particles are embodied on the mounting part or on the cap.

11. The tank level indicator as defined by claim 3, wherein the wiper is coupled to a float that floats on a surface of liquid having a level to be determined by the tank level indicator.

12. The tank level indicator as defined by claim 3, wherein the wiper slides with respect to the resistance card to establish an electrical resistance based on relative positions of the wiper and the resistance card.

13. A tank level indicator comprising:
a sensor housing;
a resistance card provided in the sensor housing;
a wiper provided in the sensor housing, the wiper being rotatably supported about an axis of rotation and cooperating in sliding fashion with the resistance card;
at least one fluid inlet in an upper portion of the sensor housing; and
at least one fluid outlet in a lower portion of the sensor housing,
wherein the sensor housing has a mounting part and a cap secured to the mounting part, and the mounting part receives the resistance card and the wiper, and the cap covers the resistance card and the wiper.

14. The tank level indicator as defined by claim 13, wherein the at least one fluid outlet is embodied on the mounting part or on the cap.

15. The tank level indicator as defined by claim 13, wherein the at least one fluid outlet is embodied on a strutlike wall of the cap, which wall extends as far as a sealing edge of the mounting part.

16. The tank level indicator as defined by claim 15, wherein the strutlike wall is embodied in the form of part of a circle or in arclike fashion.

17. The tank level indicator as defined by claim 13, wherein the means for trapping particles are embodied on the mounting part or on the cap.

18. The tank level indicator as defined by claim 13, wherein the cap is clipped onto the mounting part.

19. The tank level indicator as defined by claim 13, wherein the wiper is coupled to a float that floats on a surface of liquid having a level to be determined by the tank level indicator.

20. The tank level indicator as defined by claim 13, wherein the wiper slides with respect to the resistance card to establish an electrical resistance based on relative positions of the wiper and the resistance card.

\* \* \* \* \*

UNITED STATES PATENT AND TRADEMARK OFFICE
CERTIFICATE OF CORRECTION

PATENT NO.       : 8,418,644 B2
APPLICATION NO.  : 12/673501
DATED            : April 16, 2013
INVENTOR(S)      : Fiedor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this
First Day of September, 2015

Michelle K. Lee
*Director of the United States Patent and Trademark Office*